United States Patent [19]
Greywall et al.

[11] Patent Number: 5,831,262
[45] Date of Patent: Nov. 3, 1998

[54] ARTICLE COMPRISING AN OPTICAL FIBER ATTACHED TO A MICROMECHANICAL DEVICE

[75] Inventors: Dennis S. Greywall, White House Station; James A. Walker, Howell, both of N.J.

[73] Assignee: Lucent Technologies Inc., Murray Hill, N.J.

[21] Appl. No.: 883,740

[22] Filed: Jun. 27, 1997

[51] Int. Cl.[6] ........................................ H01J 5/16
[52] U.S. Cl. ............................ 250/227.14; 340/555
[58] Field of Search .................... 250/227.14, 227.22, 250/227.24, 229, 231.1, 231.19, 227.25; 340/555–557

[56] References Cited

U.S. PATENT DOCUMENTS 4,655,544  4/1987  Galvin et al. .................... 250/227.22

Primary Examiner—Que Le

[57] ABSTRACT

An article having an optical fiber integrally attached to a micro-device having spaced movable and nonmoving layers suitable for creating optical interference effects is disclosed. In one configuration, the micro-device is suitable for optical modulation, wherein the movable layer is electrostatically actuated to move towards the nonmoving layer. Such movement changes the size of the gap between the layers, resulting in a change in micro-device reflectivity. An optical signal is modulated by controlling micro-device reflectivity via a controlled voltage source. In a second configuration, the micro-device is suitable for measuring pressure. For pressure measurement, the movable membrane moves in response to pressure changes. The change in membrane position again results in a change in micro-device reflectivity. Reflectivity is correlatable to pressure. In a third configuration, the micro-device is suitable for measuring temperature. In the third configuration, the movable membrane is isolated from pressure effects by the addition of an evacuated cavity located beneath the membrane. The region between the movable and nonmoving layers is gas filled. Changes in gas pressure due to changes in gas temperature cause the movable layer to move, affecting micro-device reflectivity. Reflectivity is correlatable to temperature.

30 Claims, 14 Drawing Sheets

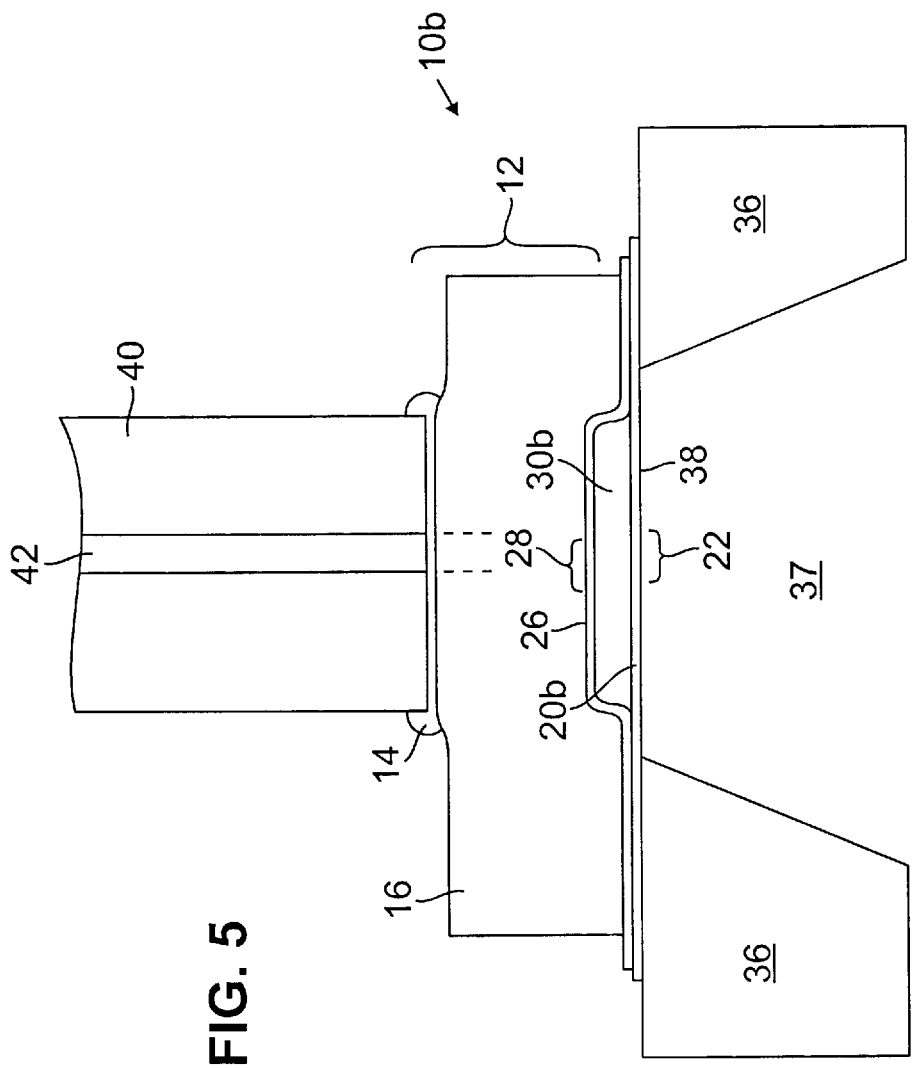

ARTICLE COMPRISING AN OPTICAL FIBER ATTACHED TO A MICROMECHANICAL DEVICE

FIELD OF THE INVENTION

The present invention relates to optical-fiber-attached micromechanical devices having a movable membrane for generating optical interference effects.

BACKGROUND OF THE INVENTION

Micromechanical devices having a movable membrane for creating optical interference effects may be used in a variety of applications. For example, such devices are useful as high speed, inexpensive optical modulators for optical communications systems. Using such devices in optical systems requires optical coupling to waveguides such as optical fibers. Such optical coupling may be problematic.

In conventional arrangements for optically coupling an optical fiber to a micromechanical device, there is a small gap between the fiber and the device. Unfortunately, undesirable optical effects resulting in signal loss and noise may result from the gap. Additionally, the presence of the gap complicates device packaging.

As such, there is a need for an improved method for attaching optical fibers to micromechanical devices, and a need for the articles resulting therefrom.

SUMMARY OF THE INVENTION

An article having an optical fiber integrally attached to a micro-device having spaced movable and nonmoving layers is disclosed. In a first embodiment, the micro-device is configured for optical modulation. The movable layer moves towards the nonmoving layer due to an electrostatic force generated by an applied voltage from a controlled voltage source. Such movement changes the size of the gap between the layers, resulting in a change in micro-device reflectivity. An optical signal can be modulated by controlling micro-device reflectivity.

In a second embodiment, the micro-device is configured for measuring pressure. The device includes a sealed chamber between the movable layer and the nonmoving layer. Gas may be present in the chamber. As the movable layer is exposed to an external pressure, it is forced towards the nonmoving layer. As in the first embodiment, the change in position of the movable layer relative to the nonmoving layer changes the reflectivity of the device. Reflectivity is correlated with pressure. An optical signal is transmitted through the optical fiber to the device. The return signal is sent to a photodetector, which sends an electrical signal corresponding to the detected light to processing electronics. Reflectivity, and hence pressure, is determined.

In a third embodiment, the micro-device is configured for measuring temperature. The device includes a sealed, gas-filled chamber on one side of the movable layer and a sealed evacuated cavity on the other side. The sealed cavity isolates the chamber from pressure effects. As ambient temperature changes and the gas between the movable and nonmoving layer expands or contracts, the movable layer moves relative to the nonmoving layer changing device reflectivity. Reflectivity is correlated to temperature. An optical signal is delivered to the micro-device via an optical fiber for assessing the change in reflectivity, and hence, temperature.

BRIEF DESCRIPTION OF THE DRAWINGS

Further features of the invention will become more apparent from the following detailed description of specific embodiments thereof when read in conjunction with the accompanying drawings in which:

FIG. 5 shows a second exemplary embodiment of an article according to the present invention wherein the micro device is configured for measuring pressure;

DETAILED DESCRIPTION

The present invention is directed to an article consisting of an optical fiber and a micromechanical device with a movable membrane suitable for creating optical interference effects. In various embodiments, the present invention is useful as an optical modulator, a pressure measuring device and a temperature measuring device. Before describing the structure and functioning of exemplary embodiments, theory underlying the optical behavior of the present invention is presented.

Figure 1:
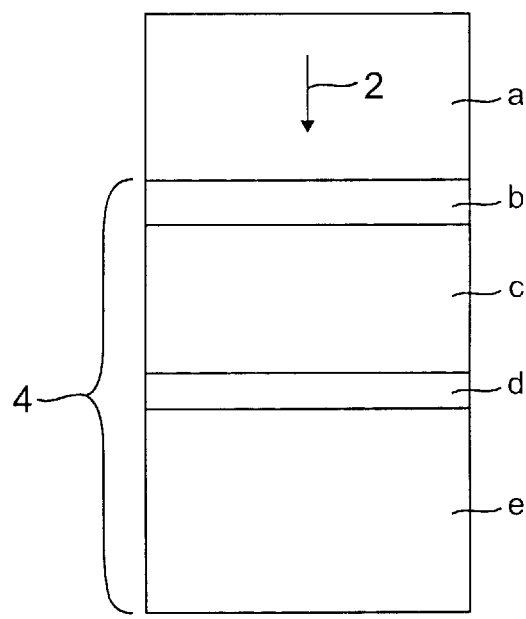
FIG. 1 shows a beam of light incident on a multi-layered structure.

FIG. 1 shows a beam 2 of monochromatic light having wavelength $\lambda$ propagating in a medium a having a refractive index $n_a$. The beam 2 is normally incident on a flat, multi-layered structure 4. The structure 4 consists of a plurality of layers b–e, characterized by respective refractive indices $n_b$, $n_c$, $n_d$ and $n_a$. Layer b has a thickness $t_b$:

$$t_b = m_b \lambda / (4 n_b)$$

where $m_b$ is an odd integer. Similarly layer d has a thickness $t_d$:

$$t_d = m_d \lambda / (4 n_d)$$

where $m_d$ is an odd integer. A reflection coefficient $r_{ab}$ for the a–b interface is given by:

$$r_{ab} = \frac{n_b - n_a}{n_b + n_a}$$

Analogous expressions define reflection coefficients $r_{bc}$ for the b–c interface, $r_{cd}$ for the c–d interface and $r_{de}$ for the d–e interface. Using conventional geometrical optics and accounting for multiple reflections, a relative amplitude $A_r/A$ of the reflected beam is given by:

$$\frac{A_r}{A} = \frac{r_{ab} - r_{bc}}{1 - r_{ab}r_{bc}} - \frac{(1 - r_{ab}^2)(1 - r_{bc}^2)}{(1 - r_{ab}r_{bc})^2} \cdot \frac{\overline{r_{cd}}e^{i\phi}}{1 - \overline{r}^2 e^{i\phi}} \quad [1]$$

where:

$$\overline{r}^2 = \frac{r_{cd}(r_{ab} - r_{bc})}{1 - r_{ab}r_{bc}},$$

$$\overline{r}_{cd} = r_{cd} - \frac{r_{de}(1 - r_{cd}^2)}{1 - r_{cd}r_{de}} \text{ and}$$

$$\phi = 2\pi \cdot (2n_c t_c/\lambda)$$

Expression [1] will be used later in this specification for characterizing the optical performance of the present invention.

Figure 2:
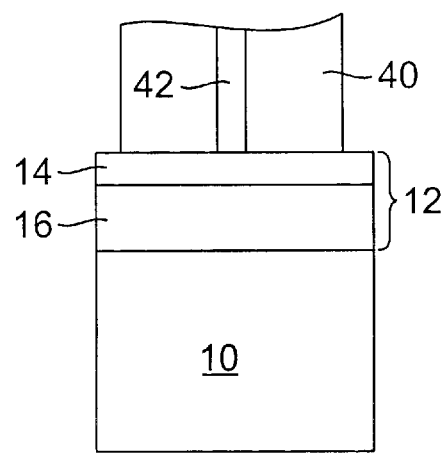
FIG. 2 shows a cross-sectional view of an article according to the present invention comprising an optical fiber in optical communication with a micro device.

As previously indicated, the present invention is directed to an article consisting of an optical fiber and a micro device with a movable layer suitable for creating optical interference effects. FIG. 2 shows a cross-sectional view of an article according to the present invention comprising an optical fiber 40 having a core 42 in optical communication with a micro device 10. The optical fiber 40 may be single mode, multi-mode, plastic-coated silica fiber, plastic fiber and the like. According to the present invention and unlike conventional arrangements, an integrating arrangement 12 is used to make the optical fiber 40 an "integral" portion of the micro device 10. As used herein, the word "integral" is meant to signify that there is, effectively, a fiber-micro device interface, i.e., no gap exists nor is there a material layer between the core 42 and the micro device 10 having a refractive index different from that of the core 42.

In one embodiment, the integrating arrangement 12 includes a layer 14 of cement and a layer 16 of glass. The layers 14 and 16 are index-matched to that fiber core 42, i.e., the layers and the core have the same index of refraction. The glass layer 16 provides support for an adjacent layer of the micro device 10, as described further below.

As a result of integrating the fiber 40 with the micro device 10 in the manner described, interference effects that would otherwise occur if the fiber end and the micro device were spaced are substantially reduced or eliminated. Moreover, neither special ferrules or yokes are used to maintain fiber alignment, advantageously minimizing thermal contraction problems.

I. First Exemplary Embodiment—Configuration for Optical Modulation

Figure 3:
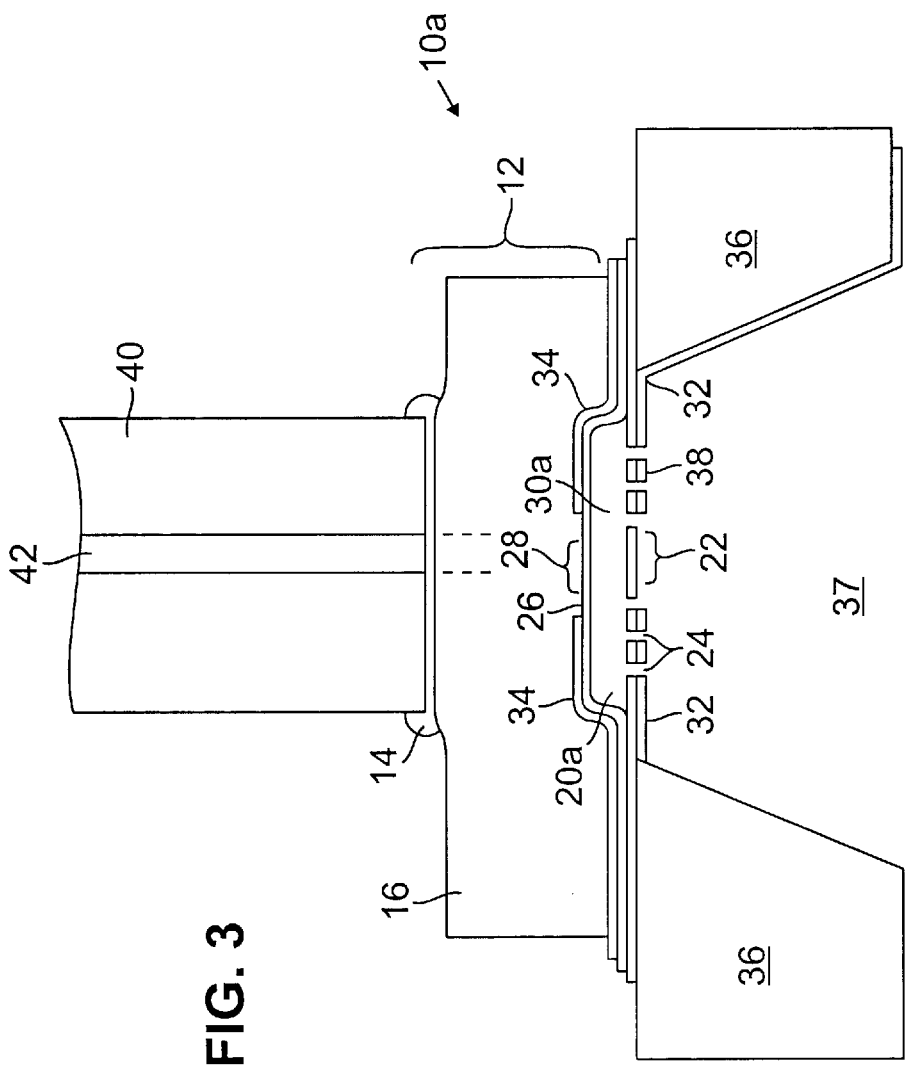
FIG. 3 shows a first exemplary embodiment of an article according to the present invention wherein the micro device is configured to modulate an optical signal.

In a first exemplary embodiment of an article according to the present invention shown in FIG. 3, the fiber 40 is integrated with a micro device 10a operable to modulate an optical signal. The fiber 40 is in optical communication with at least a portion of a movable layer 20a. The movable layer 20a is supported at its periphery by a support layer 36. A well 37, defined within the support layer 36, is located beneath the movable layer 20a. In the illustrated embodiment, the bottom 38 of the well 37 is defined by the movable layer 20a. The well 37 releases the movable layer 20a allowing it move vertically. Additionally, the well 37 can be used for receiving a second optical fiber, not shown, if the micro-device 10a is operated in a transmissive mode.

A nonmoving layer 26 is spaced from the movable layer 20a, creating a gap 30a therebetween. Damping holes 24 are provided to control ringing in the movable layer 20a, especially at operating frequencies above about 1–2 MHz. In preferred embodiments, the layer 20a has a circular shape.

Further description of design considerations for an optical modulator having a circular shape and damping holes are provided in a U.S. patent application entitled METHODS AND APPARATUS FOR AN IMPROVED MICROMECHANICAL MODULATOR, filed Feb. 1, 1996 as Ser. No. 08/565,453 now U.S. Pat. No. 5,751,469. Additional description concerning the design of micromechanical optical modulators may be found in U.S. Pat. No. 5,500,761, and U.S. patent applications Ser. No. 08/478,590 filed Jun. 7, 1995 now U.S. Pat. No. 5,654,819, Ser. No. 08/479,476 filed Jun. 7, 1995 now U.S. Pat. No. 5,589,974 and Ser. No. 08/815,774. It should be understood, moreover, that the micro-device 10a may suitably be structured, for example, as a Fabry-Perot device having equal reflectivity mirrors. See, Aratani et al., "Process and Design Considerations for Surface Micromachined Beams for a Tuneable Interferometer Array in Silicon," Proc. IEEE Micro. Electromech. Workshp., Ft. Lauderdale, Fla, Feb. 7–10, 1993, pp. 230–235. The aforementioned patent, patent applications and article, and any other such materials cited in this specification are incorporated by reference herein. The modulators described in the aforementioned patent and patent applications have a different structure than the afore-described embodiment of the present invention. In view of the present teachings, those having ordinary skill in the art will be able, as desired, to adapt the teachings of those references to the presently disclosed device.

A voltage, delivered by a controlled voltage source, not shown, is applied to the nonmoving layer 26 and the movable layer 20a. An electrostatic force is thereby generated between those layers. The electrostatic force causes the movable layer 20a to move from its quiescent or equilibrium position towards the nonmoving layer 26. The change in position of the movable layer 20a results in a change in the size of the gap 30a. As a result, the reflectivity of micro-device 10a changes. An optical signal can be modulated by controlling the change in reflectivity via the controlled voltage source.

It will be appreciated that the nonmoving layer 26 and the movable layer 20a must be suitably conductive. If one or both of the layers 20a, 26 are not intrinsically conductive, or not capable of being rendered conductive by doping with suitable dopants, then an additional conductive layer is disposed adjacent to at least a portion of one or both of the layers 20a, 26. Conductive layers 32 and 34 are shown disposed adjacent to a portion of the respective movable and nonmoving layers. The conductive layers may be, for example, aluminum, gold or other suitable metals, or polysilicon. Using polysilicon as the material for the conductive layer 32 is convenient in the sense that the support layer 36 may be polysilicon. In such a embodiment, the conductive layer 32 can be formed by using a timed etch to prevent the etch from proceeding all the way through the support layer during well 37 formation. A thin layer of the support layer thus remains, serving as the conductive layer 32. As indicated above, however, such an etch must be timed. Moreover, the optics expressions developed herein do not allow for such a layer.

The movable and nonmoving layers must be optically transparent at the operating wavelength(s). More particularly, region 22 of the movable layer 20a and region 28 of the nonmoving layer 26, both in optical communication with the optical fiber core 42, must be optically transparent. If one or both of the conductive layers 32, 34 are present, and such layers are not optically transparent at the relevant wavelength(s), then such layers must not be present either below or above the regions 22 and 28 of the movable and nonmoving layers. The regions 22, 28 are referred to herein as an optical window.

The micro-device 10 is fabricated using photolithographic methods. Briefly, a first layer of silicon nitride or polysilicon is deposited on a first side of a silicon wafer. That layer, when released, forms the movable layer 20a. A "pill" of a readily-etchable sacrificial material, such as, without limitation, silicon dioxide, phosphoro-silicate glass (PSG) or the like, is deposited on the first layer. A second layer, comprised of silicon nitride or polysilicon, is deposited on top of the pill. The materials choice for the second layer may be selected independently of the materials choice for the first layer. A layer 16 of glass is deposited over the second layer. The wafer is etched from the second side to the first layer. Holes 24 are etched into the first layer. Note that such holes must be etched through the conductive layer 32, if present. Etchant is delivered, through the holes 24, to the pill of sacrificial material sandwiched between the first and the second layer. The sacrificial material is etched away, releasing the first layer. The second layer is supported by the overlying layer 16 of glass. A layer 14 of cement, e.g. epoxy, is used for attaching the fiber 40 to the layer 16.

An alternate embodiment of the integrating arrangement 12 for use with suitably-structured micro-devices 10 does not require the layer 16 of glass. Such suitably-structured micro-devices 10 incorporate a nonmoving layer 26 that is, relatively speaking, thicker and/or of smaller diameter than the layer 26 present in devices requiring the layer 16.

Additional information concerning the fabrication of micromechanical optical modulators may be found in the above-referenced patent and patent applications.

The optical performance of the article as modulator shown in FIG. 3 and described above can be characterized using expression [1]. Expression [1] was developed based on the exemplary multi-layer article 4 shown in FIG. 1. The exemplary article shown in FIG. 3 is related to the article 4 as follows: the fiber core 42 and the integrating arrangement correspond to layer a, the nonmoving layer 26 corresponds to the layer b, the gap 30a corresponds to the layer c, the movable layer 20a corresponds to the layer d, and the well 37 beneath the movable layer 20a corresponds to the layer e.

Figure 4:
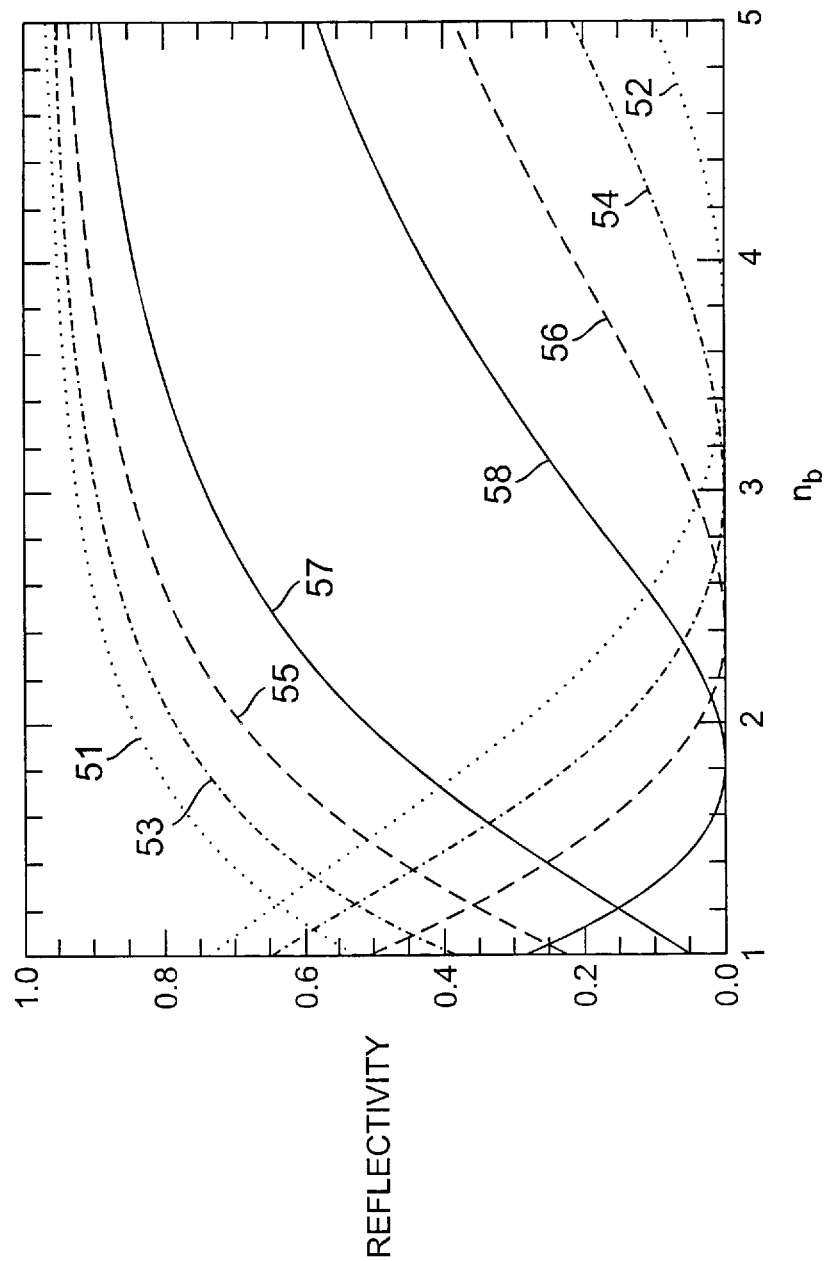
FIG. 4 shows the optical response of the article of FIG. 3.

The optical performance of the first exemplary embodiment, as calculated using expression [1], is shown in FIG. 4. That Figure shows reflectivity as a function of the refractive index of the layer b, i.e., the nonmoving layer 26. Curves are shown for a variety of values of the refractive index of layer d, i.e., the movable layer 20a. For curves 51 and 52, $n_d=3.0$; for curves 53 and 54, $n_d=2.5$; for curves 55 and 56, $n_d=2.0$; and for curves 57 and 58, $n_d=1.5$. The curves are developed based on the assumption that the refractive index of layer a, the optical core 42, is 1.467, which is a typical value for single-mode fiber.

For curves 52, 54, 56 and 58, the thickness $t_c$ of the gap 30a is equal to $m\lambda/(4n_c)$, where m is an even integer and $\lambda$ is the operating wavelength. Zero reflectivity is observed for each of such curves at a particular value of the refractive index $n_b$ of the layer b. For curves 51, 53, 55 and 57, the thickness $t_c$ of the gap 30a is equal to $m\lambda/(4n_c)$, where m is an odd integer. The curves 51, 53, 55 and 57 show a significantly higher value of reflectivity at the same value of $n_b$ that resulted in zero reflectivity for curves 52, 54, 56 and 58.

Contrast may be defined as the ratio of reflectivity at $t_c=m\lambda/(4n_c)$, where m is an odd integer to the reflectivity at $t_c=m\lambda/(4n_c)$ where m is an even integer. FIG. 4 indicates that very high contrast is obtained if the refractive index $n_b$ of the nonmoving layer 26 is an amount larger than the refractive index $n_d$ of the movable layer 20a. FIG. 4 shows, for example, that if $n_d=2.0$, which is the condition for curve 56, zero reflectivity is obtained if $n_b$ is about 2.4. Both of those index values are in the allowable range for silicon nitrate films. Such a film can be made to possess high tensile stress, which is required for MHz-speed modulation devices.

In an exemplary design, the gap 30a is equal to $3\lambda/(4n_c)$ in the quiescent position. Thus, there is a maxima in reflectivity at zero applied voltage. With an applied voltage of the proper magnitude, the gap 30a spacing is reduced to about $2\lambda/(4n_c)$, which corresponds to zero reflectivity. As previously noted, the aforedescribed embodiment of the present invention can be operated in either a reflection mode with the single optical fiber 40, or in a transmissive mode wherein a second fiber to receive the modulated signal that is transmitted, in varying amounts, through the movable layer 20a. See, U.S. patent application Ser. No. 08/775,910 filed Jan. 2, 1997.

II. Second Exemplary Embodiment—Configuration for Measuring Pressure

In a second exemplary embodiment of the present invention shown in FIG. 5, the fiber 40 is integrated with a micro-device 10b configured for measuring pressure. The micro-device 10b has a nonmoving layer 26 and a movable layer 20b, which layers are spaced forming chamber 30b therebetween. The chamber 30b is analogous to the gap 30a of the first exemplary embodiment. The movable layer 20b is supported at its periphery by support layer 36. A well 37 is defined within the support layer 36 underneath the movable layer 20b. Fiber 40 is attached to the micro-device 10b by integrating arrangement 12. As in the first exemplary embodiment, the integrating arrangement preferably includes a layer 14 of cement and a layer 16 of glass. The layers 14 and 16 are index-matched to the fiber core 42.

The exemplary configuration for measuring pressure shown in FIG. 5 is structurally similar to the configuration useful for optical signal modulation shown in FIG. 3. There are, however, some structural differences arising from the functional differences between those two configurations, as described below. For example, as configured for measuring pressure, the movable layer 20b is actuated or moved from an equilibrium position by the pressure exerted on it by a fluid in which the article is immersed. As such, unlike the first configuration, the pressure measuring configuration does not require any structure associated with applying a voltage to the movable and non-moving layers.

Advantageously, and unlike prior art pressure measuring devices, the present article, as configured for measuring pressure, is exceedingly small, e.g., as small as about 25 microns, and more typically 100+ microns, so as to cause reduced disturbances in the pressure-measuring environment. Moreover, the only connection to the micro-device 10b incorporating the movable layer 20b is an optical fiber 40. This is particularly advantageous in applications in which the present article is intended to be placed well into a target environment, as opposed to being located along a vessel wall or the like.

A second structural difference between the configuration for optical signal modulation and that for pressure measurement is that in the case of pressure measurement, there are no damping holes 24 in the movable membrane 20b. In other words, the chamber 30b is sealed.

The operating principle underlying pressure measurement using the present invention is described below. As the movable layer 20b is exposed to a fluid pressure, it will move, i.e., bulge, towards the non-moving layer 26. The change in position of the movable layer 20b results in a change in the size of the chamber 30b. As a result, the reflectivity of micro device 10b changes. Such a change in reflectivity can be correlated to the pressure extant on the movable layer 20b.

II.A Mechanical Response of an Article According to the Present Invention Configured for Measuring Pressure The mechanical response of an article configured for measuring pressure according to the present invention is described below. The chamber 30b is assumed to have a cylindrical geometry for the following mathematical analysis. It should be understood that such a geometry is not required. In cases where the geometry is not cylindrical, the following analysis must be appropriately changed.

If the pressure $P_d$ inside the chamber 30b is equal to the ambient pressure P, the movable layer 20b is flat. The chamber 30b volume is then $V_o = \pi R^2 t_o$, where R is the radius of the chamber 30b and $t_o$ is its height. In a first embodiment, referred to herein as a "type I pressure measuring device," the chamber 30b is assumed to be evacuated. By definition, $P_d$ is equal to zero for a type I pressure measuring device. In a second embodiment, referred to herein as a "type II pressure measuring device," the chamber 30b is filled with a fixed amount of gas. For the type II pressure measuring device, the pressure $P_d$ inside the chamber 30b depends on the ambient temperature T and pressure P, on the mechanical properties of the movable layer 20b, and on the amount of gas sealed in the chamber 30b.

The equilibrium position of the membrane is determined the force equation:

$$Et_m/[12(1-\sigma^2)] \cdot \nabla^4 u(r) - \zeta \nabla^2 u(r) + f = 0 \qquad [2]$$

where: u(r) is the displacement of the movable layer 20b at radial distance r from its center, $t_m$ is the thickness of the movable layer 20b, $\sigma$ is Poisson's ratio, E is Young's modulus, $\zeta$ is the stretching force per unit length along the edge of the movable layer 20b, and f is an applied force per unit area.

For displacements u(r) that are small compared to the radius of the movable layer 20b, membrane stress S is about constant and $\zeta = S\, t_m$. The expression for f is:

$$f = P - P_d - \rho_m g t_m$$

where: $\rho_m$ is the average density of movable layer 20b. Using typical numbers for $\rho_m$ and $t_m$, e.g., $\rho_m = 3.1$ (silicon nitride) and $t_m = 0.2$ microns ($\lambda/4$ membrane), the quantity $\rho_m g\, t_m$ is found to be about $10^{-6}$ bar, and so will be neglected. The effect of gravity as a contribution to the applied force f is therefore negligible. Thus, the relative orientation of the movable layer, i.e., vertical, horizontal, etc., is not important.

In the following description, it will be assumed that the second term in expression [2], which is proportional to the stress, is large compared to the first term associated with bending moments. This applies if the stress S in the movable layer 20b is greater than or equal to about 50 mega pascals (MPa).

The simplified force equation has the solution:

$$u(r) = [(P - P_d)(R^2 - r^2)]/(4S\, t_m).$$

The midpoint displacement $u_{mp}$, i.e., u(r=0) is then given by:

$$u_{mp} = [R^2/(4S\, t_m)] \cdot (P - P_d).$$

A dimensionless parameter $\beta$ is defined for use below:

$$\beta = [R^2/(4S\, t_m)] \cdot (P_o/2t_o),$$

with $P_o$ defined as 1 bar. It should be understood that $P_o$ is simply a reference parameter for use in developing the dimensionless parameter $\beta$. The expression for midpoint displacement of the movable layer 20b may then be expressed:

$$u_{mp} = 2\beta t_o \cdot (P - P_d)/P_o. \qquad [3]$$

For a type I pressure measuring device, since $P_d$ is defined to be equal to zero, expression [3] becomes:

$$u_{mp} = 2\beta t_o \cdot P/P_o. \qquad [4]$$

The movable layer 20b must not be allowed to contact the non-moving layer 26 over the pressure range of the device, thus constraining the allowed values of $\beta$. If $P_{max}$ is the maximum pressure to be measured, then for $P < P_{max}$, $u_{mp} < t_o$. Thus, using expression [4]:

$$\beta < (P_o/2P_{max}). \qquad [5]$$

Thus, for example, a type I pressure device with a maximum pressure of 1 bar must have $\beta < 0.5$.

For a type II pressure measuring device, $$(u_{mp}/t_o) = \{[1+\beta(P/P_p)] - [(1-\beta(P/P_p))^2 + 4\beta(P_o/P_p)\,(T/T_p)]^{0.5}\}/(P/P[\phi])$$

where: $P_p$ is packaging pressure and $T_p$ is the packaging temperature of the gas in the chamber 30b at the time the chamber is sealed.

To simplify the following description, it will be assumed that $P_p = 1$ bar so that $P_p = P_o$ and:

$$(u_{mp}/t_o) = [1 + \beta/(P/P_o)] - [(1 - \beta(P/P_o))^2 + 4\beta(T/T_p)]^{0.5} \qquad [7]$$

The movable layer 20b touches the non-moving layer 26 at $P_{max}$. Setting $(u_{mp}/t_o) = 1$ at $P_{max}$ and $T = T_p$:

$$P_{max}/P_o = 2 + 1/(2\beta). \qquad [8]$$

Since $\beta$ is positive, the right hand side of expression [8] is always greater than 2. As such, independent of the mechanical properties of the movable layer 20b, the movable layer will not touch the non-moving layer 26 for pressures less than 2 bar. That result is due to the compression of gas in the chamber 30b. That is, when the movable layer 20b touches the non-moving layer 26, the volume of the chamber 30b has been reduced by a factor of 2.

For $P_{max}/P_o$ greater than 2, the requirement that the layers do not touch requires that:

$$\beta < 1/\{2[(P_{max}/P_o) - 2\,(T/T_p)]\} \qquad [9]$$

For a high pressure gauge, i.e., $P_{max}/P_o \gg 1$:

$$\beta < P_o/(2P_{max}) \quad [10]$$

Note that expression [10] is the same as expression [5]. This result indicates that for the stated conditions, compressing the gas in the chamber 30b generates a force that is insignificant compared to the restoring force associated with the tension in the movable layer 20b.

II.B Optical Response of an Article According to the Present Invention Configured for Measuring Pressure The optical responses of type I and type II pressure measuring devices according to the present invention are described below. As ambient pressure P increases, the gap between movable layer 20b and the non-moving layer 26 decreases. The gap size $t_c$ is given by:

$$t_c = t_o - u_{mp} \quad [11]$$

The midpoint displacement $u_{mp}$ (P) is given by expression [4] for a type I pressure measuring device and expressions [6] or [7] for a type II pressure measuring device. Substituting $t_c$(P) into expression [1] gives the amplitude of the reflected light as a function of pressure.

Figure 6A:
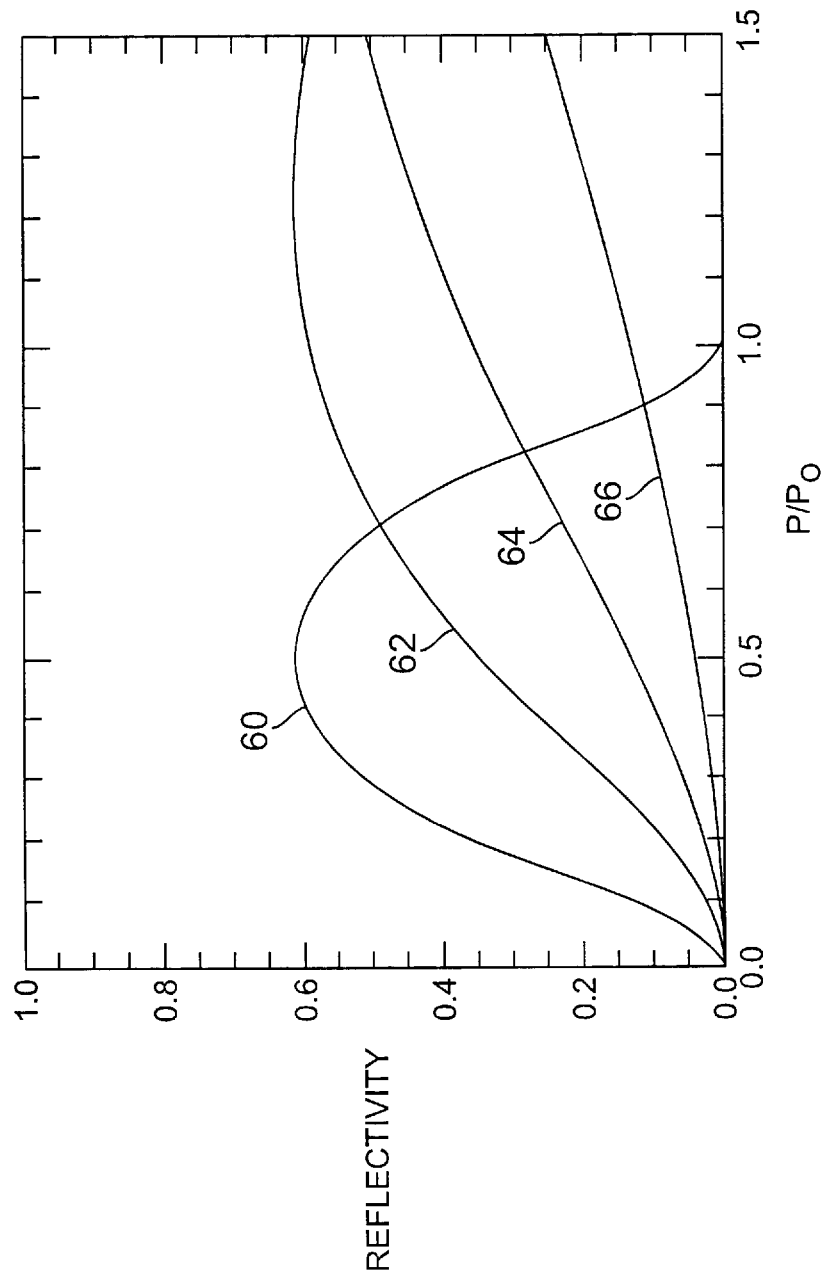
FIGS. 6a, 6b and 7 show response for a type I pressure measuring device according to the present invention.
Figure 6B:
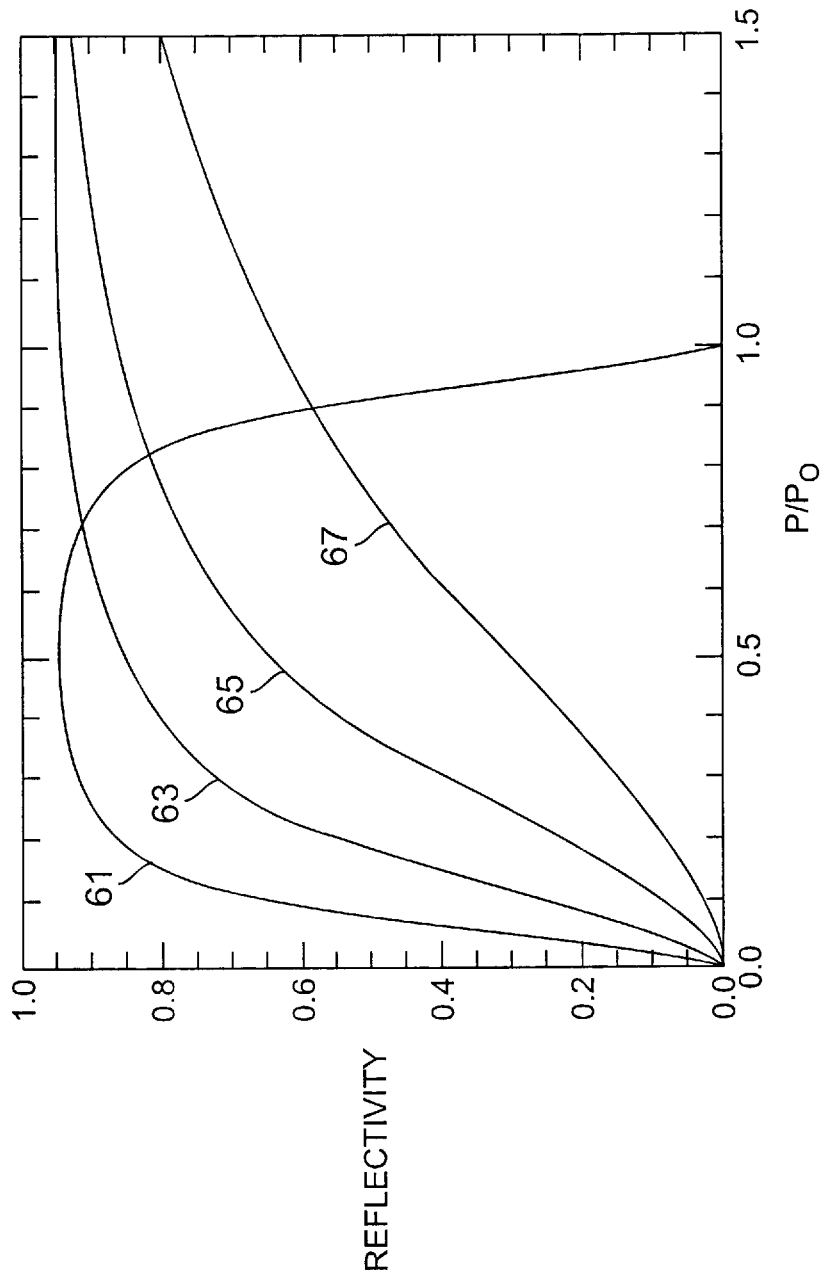
Figure 7:
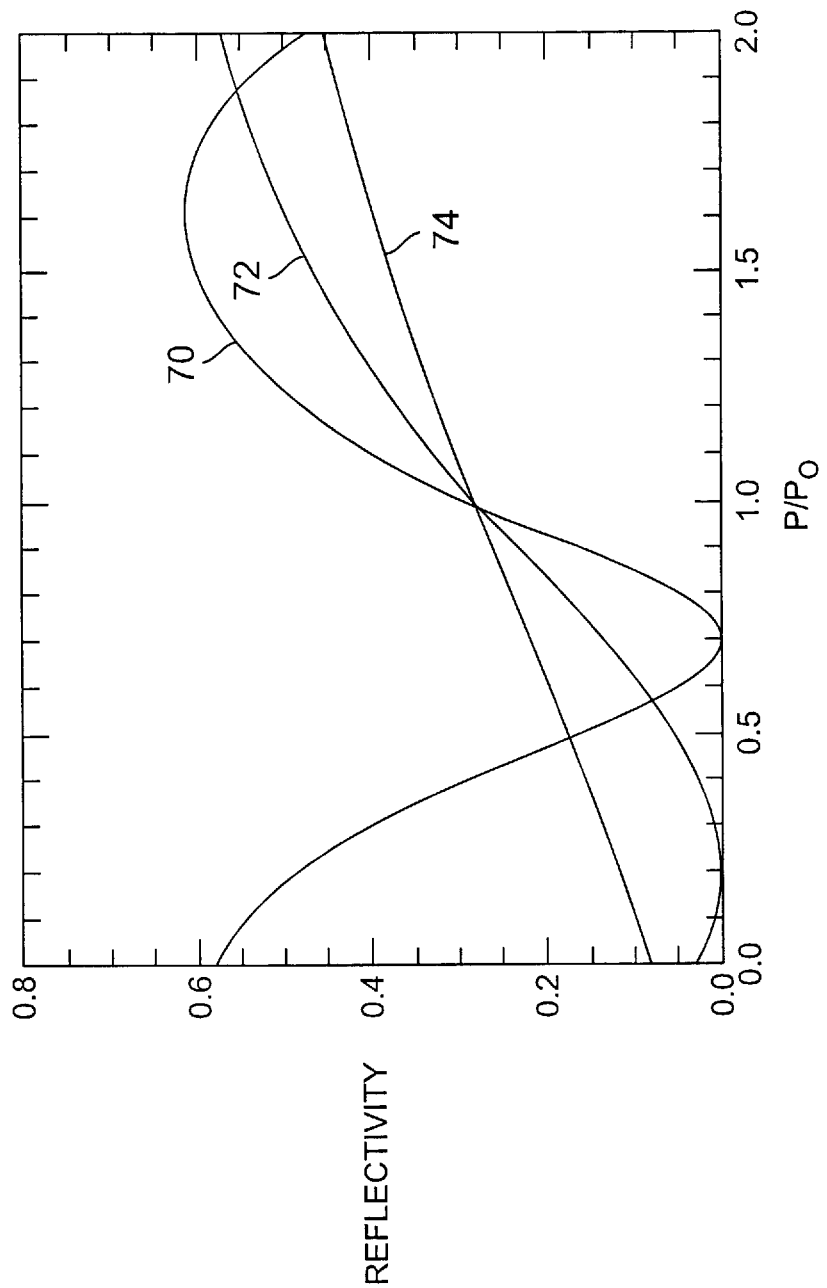

FIGS. 6a, 6b and 7 show reflectivity versus $P/P_o$ ("the optical response")for a type I pressure measurement device according to the present invention. For all examples described in this Section, the pressuring measuring device is assumed to measure the pressure of a fluid having an optical index of water, i.e., about 1.33.

FIG. 6a shows the optical response for a device with a chamber height $t_o = m\lambda/(4n_c)$, m=2 and $n_b = n_d = 2.00$. As to the correspondence between the structure of a pressure measuring device according to the present invention and the multi-layered structure 4 shown in FIG. 1 and used in the development of expression [1], the fiber core 42 and the integrating arrangement 12 correspond to layer a, the non-moving layer 26 corresponds to the layer b, the chamber 30b corresponds to the layer c, the movable layer 20b corresponds to the layer d, and the region 38 beneath the movable layer 20b corresponds to the layer e.

The optical response shown in FIG. 6a is typical for a device in which the nonmoving and movable layers are formed of silicon nitride, which has a refractive index of about 2.0. In FIG. 6a, the curves numbered 60, 62, 64 and 66 show the optical response for β=0.5, 0.2, 0.1 and 0.05, respectively. All of the curves 60–66 begin at the origin since at P=0, the movable layer is at its equilibrium position and $t_c = t_o = \lambda/(2n_c)$ implying zero reflectivity. As previously described, if β=0.5, the movable layer 20b touches the nonmoving layer 26 at P=1 bar. For a device operating near 1 bar, β of 0.1 provides the highest sensitivity, i.e., the greatest change in reflectivity for a given change in pressure, of the β values shown.

FIG. 6b shows the optical response for a device with the same chamber height $t_o = m\lambda/(4n_c)$, m=2, but $n_b = n_d = 3.5$. The refractive indices used for FIG. 6b are typical for devices in which the nonmoving and movable layers are formed of polysilicon. In FIG. 6b, the curves numbered 61, 63, 65 and 67 show the optical response for β=0.5, 0.2, 0.1 and 0.05, respectively. For a device operating near 1 bar, a β of 0.05 provides the highest sensitivity of the β values shown.

To achieve a higher sensitivity for operating near 1 bar ambient pressure, a chamber 30b having a greater height $t_o$ may suitably be used. Moreover, a device can be designed to achieve a specific reflectivity at a particular ambient pressure by appropriately adjusting chamber height $t_o$, as follows.

First, a desirable reflectivity $R_{sel}$ is chosen from among the allowable range of values for a given optical system. Due to the sinusoidal nature of the variation in reflectivity with gap, the chosen value of $R_{sel}$ occurs at many different values of $t_c$. Choosing to have device reflectivity increase with pressure, such different values of $t_c$ are given by:

$$t_c = (m-\alpha)\lambda/(4n_c), \quad [12]$$

with m being an even integer, and $0 \leq \alpha \leq 1$, where α is a modifier to integer m. Combining expression [11] and [12] and using expression [4] with P equal to the selected pressure $P_{sel}$ gives:

$$t_o = [(m-\alpha)\lambda/(4n_c)]/[1 - 2\beta P_{sel}/P_o]. \quad [13]$$

FIG. 7 shows the optical response of a type I pressure measuring device for measuring pressures near 1 bar. Curves 70, 72, 74 are for β equals 0.2, 0.1 and 0.05, respectively. The value of $t_o$ is determined from expression [13] with $P_{sel}$=1 bar. Such values are shown in TABLE 1. FIG. 7 is for the case where $n_b = n_d = 2.0$. The values of $t_o$ are calculated based on m=2 and α=⅓. FIG. 7 shows that sensitivity increases with β. Sensitivity can be increased by increasing m to 4 or 6, etc.

If the product $\beta P_{sel}$ is maintained constant, $t_o$ remains unchanged. Thus, neglecting the resealing of the abscissa and the β values, the optical response at another pressure, for example, $P_{sel}/P_o = 10$, would be identical to that at $P_{sel}/P_o = 1$. See TABLE 1.

TABLE 1

| β @ $P_{sel}/P_0$ = 1 | β @ $P_{sel}/P_0$ = 10 | $t_o/[\lambda/(4n_c)]$ | $t_o$, microns |
|---|---|---|---|
| 0.05 | 0.005 | 1.85 | 0.72 |
| 0.10 | 0.010 | 2.08 | 0.81 |
| 0.20 | 0.020 | 2.78 | 1.08 |

Figure 8A:
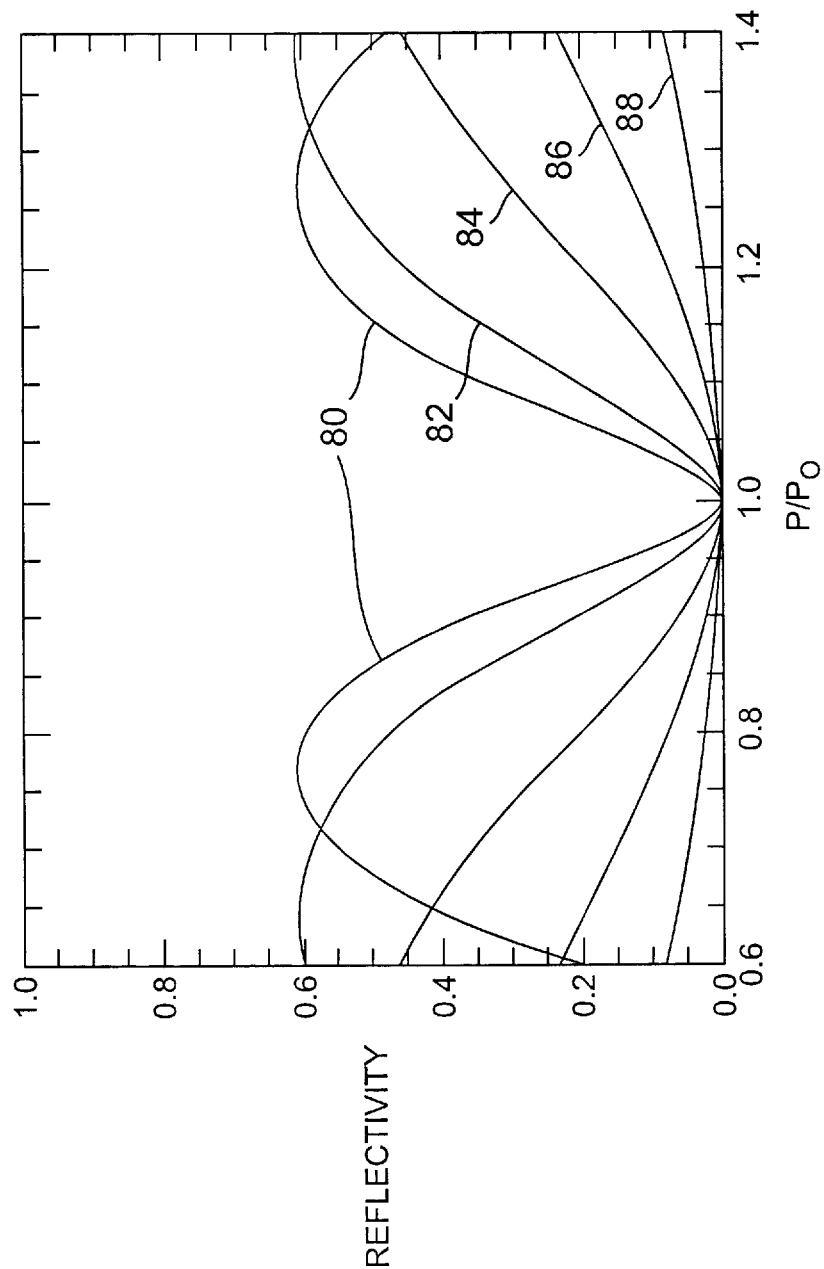
FIGS. 8a, 8b and 9 show the optical response for a type II pressure measuring device according to the present invention.
Figure 8B:
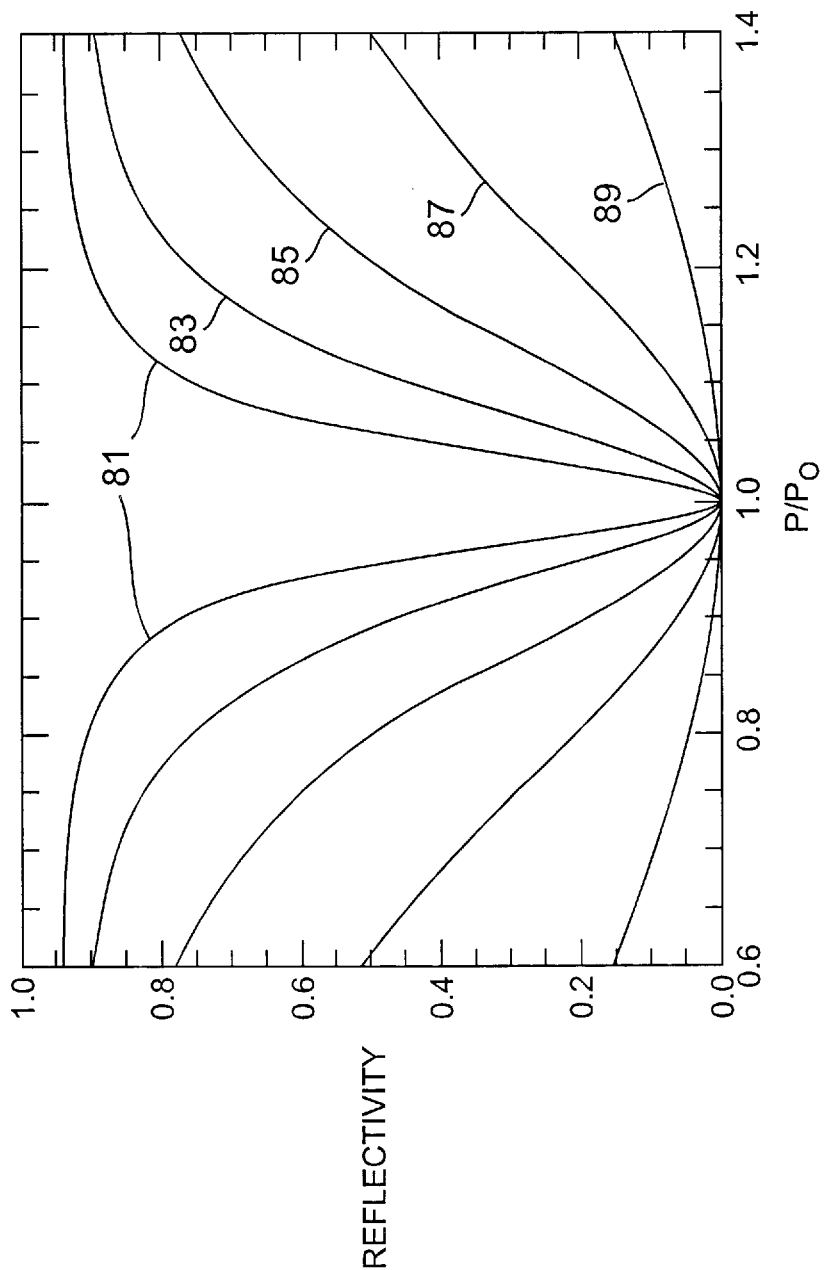
Figure 9:
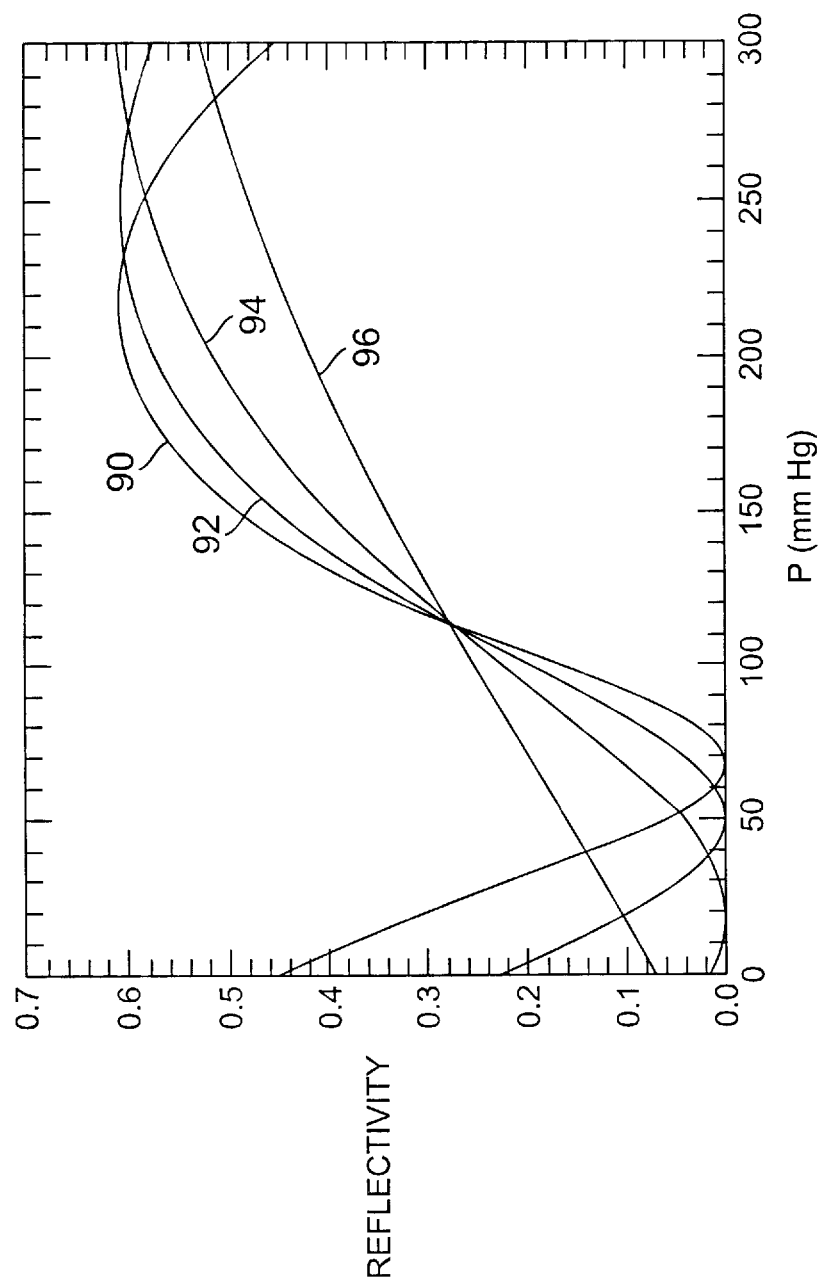

FIGS. 8a, 8b and 9 show the optical response for a type II pressure measurement device according to the present invention. FIG. 8a and 8b show the optical response for a device with a chamber height $t_o = m\lambda/(4n_c)$, m=4. For those Figures, it is further assumed that the packaging pressure $P_p = P_o$ (=1 atm) and the packaging temperature $T_p$ equals ambient temperature T. The midpoint displacement $u_{mp}$ (P) is thus given by expression [4] with $T/T_p = 1$. FIG. 8a shows the optical response for $n_b = n_d = 2.00$, i.e., silicon nitride-based movable layer 20b and nonmoving layer 26 for a variety of β values. Curves 80, 82, 84, 86 and 88 show the optical response for β equals 1.0, 0.5, 0.2, 0.1 and 0.05, respectively. FIG. 8b shows the optical response for $n_b = n_d =$ 2.00, i.e., polysilicon-based movable layer 20b and nonmoving layer 26. Curves 81, 83, 85, 87 and 89 show, respectively, the optical response for β equals 0.5, 0.2, 0.1, 0.05, and 0.02. In both Figures, at $P/P_o = 1$, movable layer 20b is flat so that the gap $t_c$ between the movable layer 20b and the nonmoving layer 26 is equal to the chamber height $t_o$o. As such, reflectivity is zero.

As for a type I pressure measuring device, it is useful to set $t_o$ so that a preselected reflectivity is obtained at a particular pressure $P_{sel}$. Assuming packaging pressure $P_p$ equals $P_o$ (1 atm) and the temperature T equals the packaging temperature $T_p$ and combining expressions [6], [10] and [11] gives, for a type II pressuring measuring device:

$$t_o=[(m-\alpha)\lambda/(4n_c)]/\{(-\beta P_{set}/P_o)+[(1-\beta P_{set}/P)^2+4\beta]^{0.5}\} \quad [14]$$

One exemplary nonlimiting use of the present type II pressure measuring device is for measuring blood pressure. The temperature control requirement is met by the known and stable temperature of the human or other type of animal body into which the device is inserted. For the present example, the device is assumed to function with a midpoint pressure of 120 mm Hg. Thus, $P_{set}/P_{set}/P_o$ is equal to (760+120)/760 or about 1.15. FIG. 9 shows the optical response of such a device assuming $n_b=n_d=2.00$, m=4 and $\alpha=\frac{1}{3}$. Curves 90, 92, 94 and 96 show the optical response for $\beta$ equals 2.0, 1.0, 0.5 and 0.2, respectively. Values of $t_o$ calculated from expression [14] are listed in TABLE 2.

TABLE 2

| $\beta$ | $t_0/[\lambda/(4n_c)]$ | $t_0$, microns |
|---|---|---|
| 0.2 | 3.86 | 1.51 |
| 0.5 | 4.07 | 1.59 |
| 1.0 | 4.29 | 1.67 |
| 2.0 | 4.51 | 1.76 |
| 5.0 | 4.74 | 1.85 |

If the pressure measuring device is to useful over a range of about 50 to 300 mm Hg, then, with reference to FIG. 9, the device may be suitably constructed with a $\beta$ of 0.5. A variation in temperature of 1° C. would change the pressure reading by about 0.3 percent.

In a further embodiment of an article configured for measuring pressure, referred to herein as a type III pressure measurement device, the movable layer includes a plurality holes of appropriate number and size. Thus, there will be gas on both sides of the movable layer that is normally in equilibrium. If a change in pressure occurs in the environment, and the frequency of that change is greater than $1/\tau$, where $\tau$ is a characteristic time associated with the decay of pressure in the chamber, i.e., a relaxation time, then a type III device can be used to indicate that change in pressure. Thus, a type III pressure measurement device according to the present invention can be used, for example, as a pressure surge indicator or microphone.

In the foregoing Figures, optical response was shown for a variety of values of the dimensionless parameter $\beta$. The parameter $\beta$ is a function of the several properties of the movable layer 30b; in particular, its thickness, diameter and stress. The parameter $\beta$ was previously defined as:

$$\beta=[R^2/(4S\ t_m)]\cdot(P_o/2t_o),$$

with $P_o$ defined as 1 bar. Expressing the stress S in MPa and substituting D/2=R, then:

$$\beta=D^2/(320S\ t_m t_o). \quad [16]$$

Assuming, for the following illustrations, that $n_b=n_d=2.00$ and $\lambda=1.56$ microns, then the movable layer 30b has a thickness $t_m$ given by:

$$t_m=m_d\lambda/(4n_d)=0.20m_d \quad [17]$$

with $m_d=1,3\ 5,\ldots$.

Representative values for the stress, thickness and diameter of the movable layer 30b for some of the above-described exemplary embodiments of pressuring measuring devices according to the present invention are provided below. The optical response of a type I pressure measuring device was shown in FIG. 7. Selecting $\beta=0.2$, Table 1 gives $t_o=1.08$ microns. Those values of $\beta$ and $t_o$, and expressions [16] and [17] give:

$$D=3.72\ (m_d S)^{0.05}.$$

Values of D computed from the previous expression are listed in TABLE 3.

TABLE 3

| S, MPa | $m_d$ | D, microns |
|---|---|---|
| 150 | 1 | 46 |
| 150 | 3 | 80 |
| 150 | 5 | 102 |
| 600 | 1 | 92 |
| 600 | 3 | 160 |
| 600 | 5 | 204 |
| 1000 | 1 | 118 |
| 1000 | 3 | 204 |
| 1000 | 5 | 263 |

In preferred embodiments, the displacement of the movable layer 30b depends linearly on the applied force. The stress due to displacement of the movable layer 30b must therefore be small compared to the intrinsic stress of the layer. This requires that $u_{mp}$ be sufficiently small compared to D. The increase in stress in the movable layer 30b is given by:

$$\Delta S=(E/2)(\pi u_{mp}/D)^2.$$

Solving for D gives:

$$D\approx 2.2u_{mp}/[(S/E)(\Delta S/S)]^{0.5}$$

Using $3.85\times 10^5$ MPa for Young's modulus E of silicon nitride, and choosing $\Delta S/S<0.1$, then $$D>4300u_{mp}/S^{0.5},$$

with S in MPa.

For the present example of a type I pressure measuring device with $\beta=0.2$, the device has a maximum usable pressure of about 1.3 bar. Using expression [4], the midpoint displacement $u_{mp}$ of the movable layer is about 0.6 microns. Thus, if S=150 MPa, then $D\geq 4300\cdot 0.6/(150)^{0.5}$ or about 200 microns. If S=600 NPa, then $D\geq 100$ microns and if S=1000 MPa, then $D\geq 80$ microns.

Similar calculations can be performed for a type I pressure measuring device with $P_{set}=10$ bar. Taking $\beta=0.02$, TABLE 1 gives $t_o=1.08$ microns. Those values of $\beta$ and $t_o$, and expressions [16] and [17] give D=1.18 $(m_d S)^{0.5}$. Likewise, for a type II pressure measuring device with $P_{set}=120$ mm of Hg and selecting $\beta=0.02$, TABLE 2 gives $t_o=1.59$ microns. Those values of $\beta$ and $t_o$, and expressions [16] and [17] give D=7.13 $(m_d S)^{0.5}$.

The movable layer 20b of type I and II pressure measuring devices do not have damping holes, such as the damping holes 24 of the movable layer 20a of the article configured for optical modulation. As such, a fabrication method different from that described for the optical modulation configuration is required. Such a method is described below.

Figure 10:
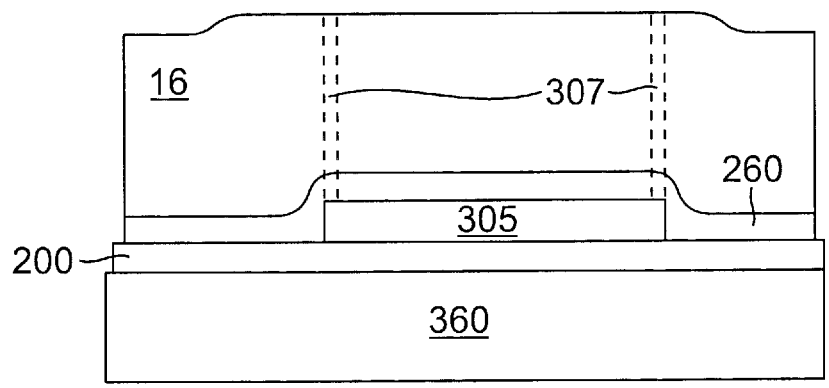
FIGS. 10–12 illustrate the fabrication of the article of FIG. 5.
Figure 11:
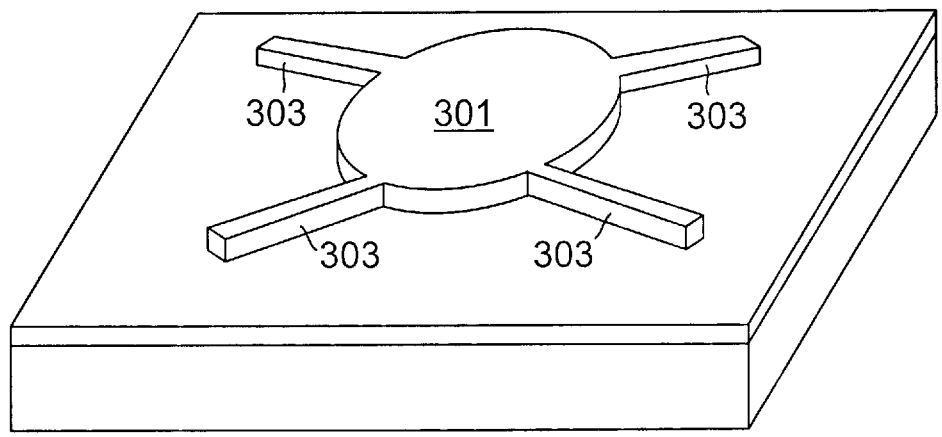

FIG. 10 shows a side view of an arrangement of various material layers that can be used in fabricating pressure measuring devices according to the present invention. Layers shown in FIG. 10 include the support layer 360, typically silicon or polysilicon. A layer 200, a part of which forms the movable layer 20b after release, is deposited on the support layer 360. A sacrificial layer is deposited on a portion of the layer 200. The sacrificial layer is deposited to a thickness equivalent to the height $t_o$ of the chamber 30b. The sacrificial layer is patterned, typically photolithographically, to form a central "pill" 301 of material having four "arms" 303 depending therefrom, as shown in FIG. 11. As described in more detail below, the arms 303 are etched away to form access ways or channels for delivering etchant to the pill 301.

The shape of the pill 301 defines the shape of the movable layer 20b. In preferred embodiments, the pill 301 is circularly-shaped to define a circular movable layer 20b. It will be appreciated that while four arms 303 are shown in FIG. 11, more or less of such arms may suitably be used for providing access channels to the pill 301. For simplicity, the pill 301 and arms 303 are shown in FIG. 10 as a sacrificial region 305.

With continuing reference to FIG. 10, a layer 260, a part of which forms the nonmoving layer 26b after release, is deposited over the arms 303, the pill 301 and exposed regions of the layer 200. A layer 16 of glass, e.g., silicon oxide, which was mentioned previously in conjunction with a description of the integrating arrangement 12, is deposited on top of the layer 260. Preferably, the layer 16 is in the range of from about 10 to 15 microns in thickness, though greater or less thicknesses may suitably be used. The layers 200 and 260 can be formed from materials such as, without limitation, silicon oxide, polysilicon, or, more preferably, silicon nitride.

Access wells 307, one for each arm 303, are formed through the layer 16 and the layer 260 to communicate with the arms 303. The access wells 307 can be formed by etching with an appropriate wet or dry etch. An exemplary wet etch suitable for etching the layers include HF-based solutions, and exemplary dry etches include fluorine-containing gasses, such as, for example, sulfur hexafluoride and carbontetrafluoride. The access wells are preferably about 3 to 10 microns in diameter. In an alternative embodiment, the arms 303 can be accessed from the side rather than from above.

The chamber 30b is formed by removing the pill 301. To do so, etchant is delivered through the access wells 307 to the arms 303. Since the arms 303 and pill 301 are formed of a material that etches rapidly compared with the surrounding material, e.g., silicon nitride, silicon oxide and the like, the arms 303 form channels in the surrounding material as they are etched. The arms 303 may suitably be patterned to have a width of about 5 to 10 microns and a height equivalent to the height of the pill 301. After the arms 303 are completely removed by the etchant, the channels formed thereby lead to the pill 301. Etchant is delivered through the channels to the pill 301, which is selectively etched in preference to the surrounding material layers 200, 260.

In preferred embodiments, the support layer 360, the pill 301 and the arms 303, are polysilicon and the movable layer 20b is silicon nitride. Using polysilicon for both of those layers advantageously facilitates etching them at the same time. Etchants useful for removing polysilicon include potassium hydroxide, ethylene diamine pyrocatechol (EDP) and hydrazine. Moreover, the aforementioned polysilicon etchants etch polysilicon at a much faster rate than either silicon nitride or silicon oxide. Thus, the etch to remove the pill 301 does not require careful timing. Furthermore, the layer 16, which is typically silicon oxide, can be deposited before removing the pill 301. Depositing the layer 16 after removing the pill 301 is problematic. In less preferred embodiments, PSG can be used for the sacrificial layer, which can be etched using hydrofluoric acid. After removing the pill 301, the access wells 307 may be filled with an epoxy. Alternatively, glass can be sputter deposited over the micro-device.

Figure 12:
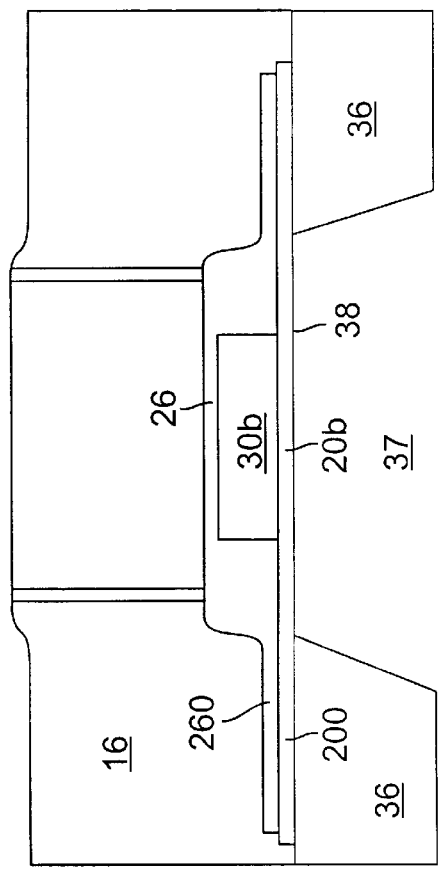

The well 37 is required, in conjunction with the gap 30b, for forming the movable layer 20b. Etchant suitable for etching the support layer 360 is selected as a function of the material used for the support layer. Such selection is within the capabilities of those ordinarily skilled in the art. FIG. 12 shows the micro-device 10b after gap and well formation.

III. Third Exemplary Embodiment—Configuration for Measuring Temperature

Figure 13:
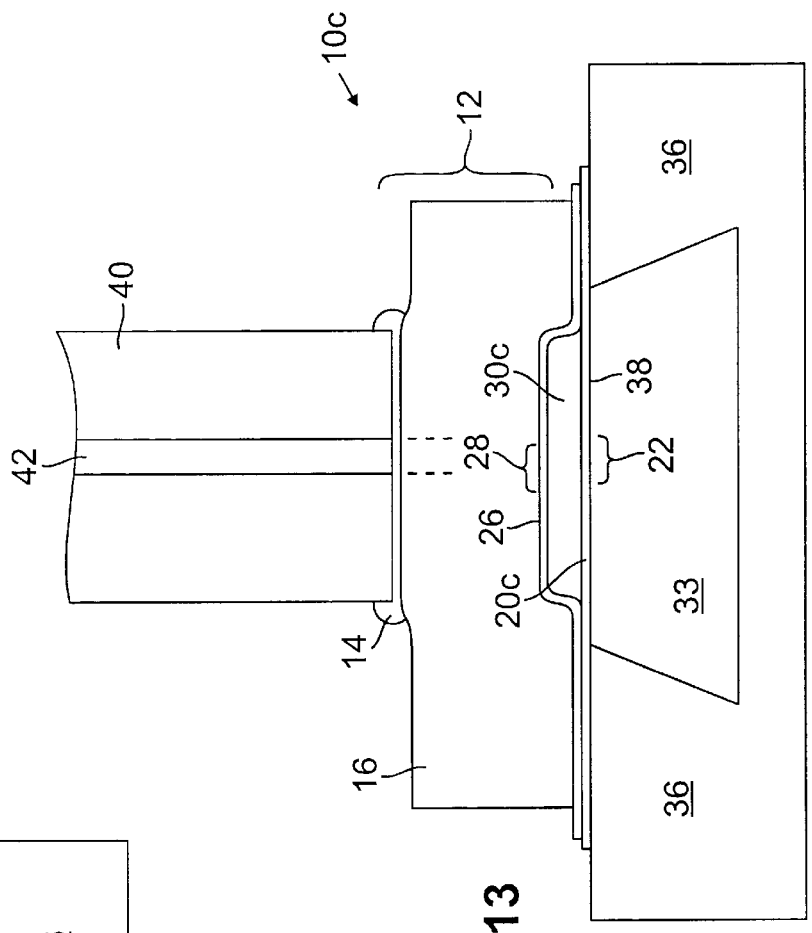
FIG. 13 shows a third exemplary embodiment of an article according to the present invention wherein the micro device is configured for measuring temperature.

In a third exemplary embodiment of the present invention shown in FIG. 13, the fiber 40 is integrated with a micro-device 10c configured for measuring temperature. The micro-device 10c has a nonmoving layer 26 and a movable layer 20c, which layers are spaced forming chamber 30c therebetween. The movable layer 20b is supported at its periphery by support layer 36. Fiber 40 is attached to the micro-device 10c by integrating arrangement 12. As in the first and second exemplary embodiments, the integrating arrangement preferably includes a layer 14 of cement and a layer 16 of glass. The layers 14 and 16 are index-matched to that fiber core 42, i.e., the layers and the core have the same index of refraction.

A cavity 33 is formed within the support layer 36 beneath the movable layer 20c. The cavity 33 is evacuated. The cavity 33 isolates the chamber 30c from variations in the ambient pressure. The movable layer 30c moves only in response to temperature changes that alter the pressure in the gas-filled chamber 30c. The change in position of the movable layer 20c results in a change in the size of the chamber 30c. As a result, the reflectivity of micro device 10c changes. Such a change in reflectivity can be correlated to the ambient temperature T In the description that follows, it is assumed that the chamber 30c is sealed with gas at packaging pressure $T_p$ packaging pressure $P_p$, and then cavity 33 is evacuated. Due to the pressure differential, the movable layer 30c bulges towards the cavity 33. The cavity 33, which corresponds to the "e" layer shown in FIG. 1, has an optical index of 1.

The midpoint deflection of the movable layer 30c can be determined using expression [7], and with ambient pressure P defined as zero:

$$(u_{mp}/t_o) = \{1 - [1 + 4\beta(P_o/P_p)(T/T_p)]^{0.5}\}/(P_o/P_p) \qquad [15]$$

The midpoint deflection $u_{mp}$ is always less than zero since the movable layer 20c deflects downwardly. As such, the movable layer 30c will never contact the nonmoving layer 26. If the packaging pressure $P_p$ is equal to $P_o$, then expression [15] may be written:

$$(u_{mp}/t_o) = 1 - [1 + 4\beta(T/T_p)]^{0.5}. \qquad [16]$$

Using expression [17] below, a device according to the present invention can be designed to provide a preselected reflectivity for a given temperature $T_{sel}$, $$t_o = [(m+\alpha)\lambda/(4n_c)]/(1+4\beta T_{sel}/T_p)^{0.5} \quad [17]$$

Figure 14:
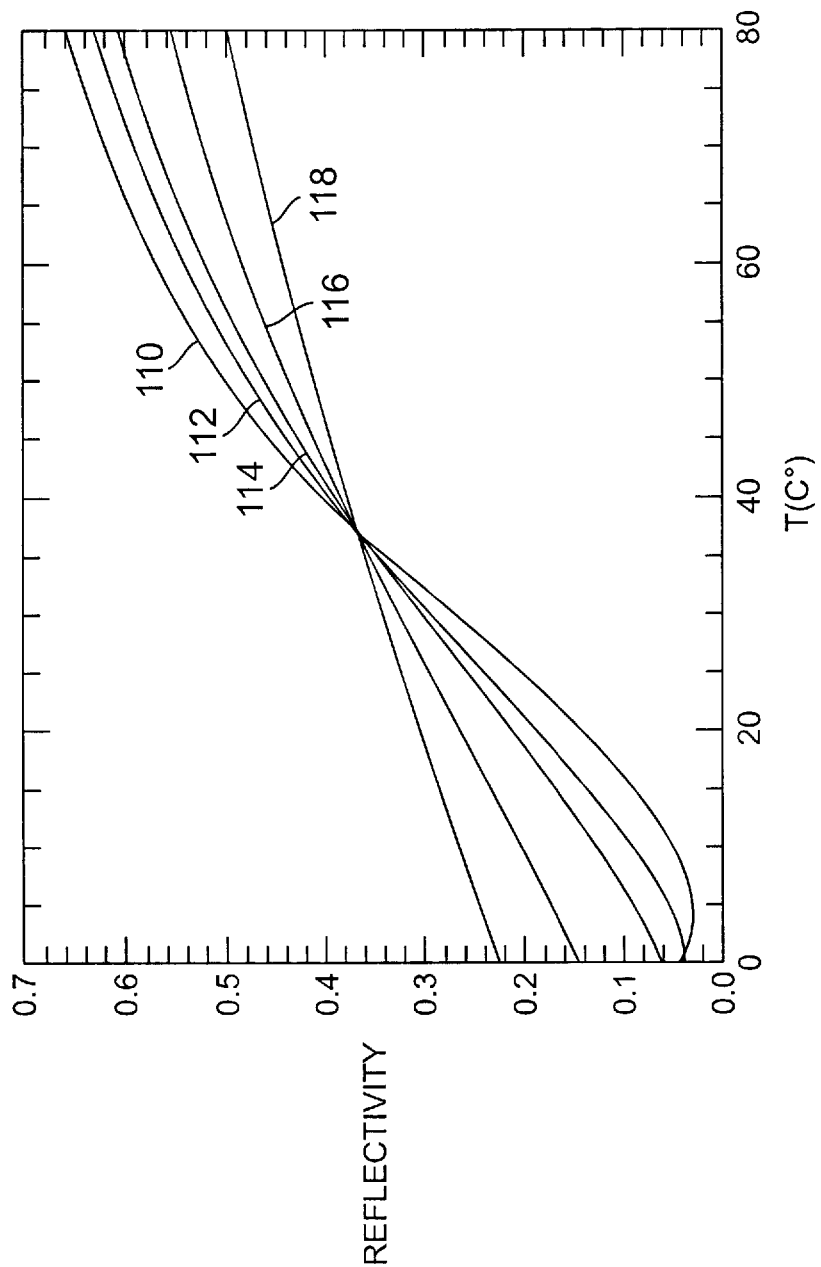
FIGS. 14 and 15 shows the optical response for the temperature measuring device of FIG. 13 at respective reference temperatures of 300 K. and 473 K.

FIG. 14 shows the optical response, i.e., reflectivity vs. temperature, for a temperature measuring device with $T_{sel}$=310 K. (37° C.), $n_b=n_d=2.00$, $T_p=300$ K., m=6 and $\alpha=\frac{1}{3}$. Chamber height $t_o$ for a variety of values of β are shown in TABLE 4. Expression [17] was used to calculate $t_o$ and expressions [1], [11] and [16] were used to generate the optical response curves shown in FIG. 14. Curves 110, 112, 114, 116 and 118 show the optical response for β equals 0.1, 0.2, 0.5, 1.0 and 10.0, respectively.

Figure 15:
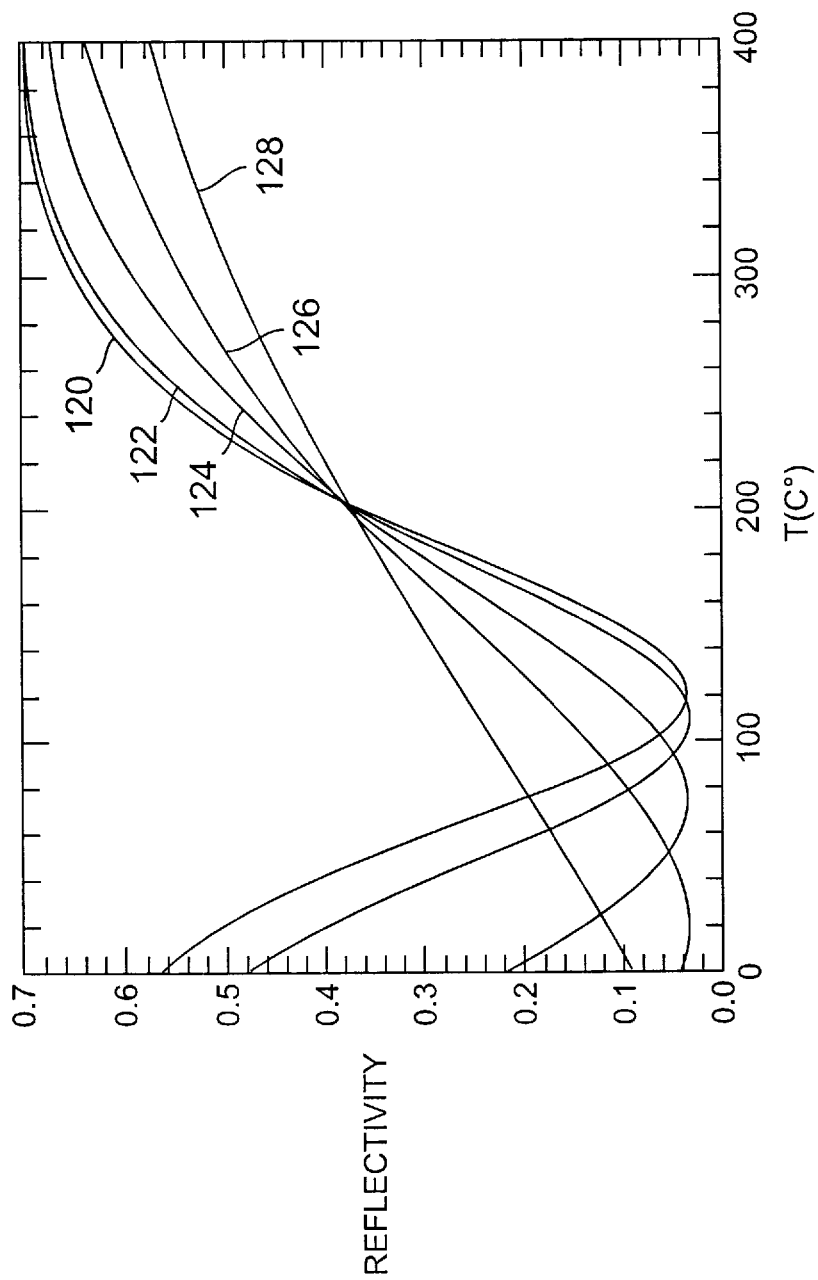

FIG. 15 shows the optical response for a temperature measuring device with $T_{sel}$=473 K. (200C), $n_b=n_d=2.00$, $T_p=300$ K., m=4 and $\alpha=\frac{1}{3}$. Values for chamber height $t_o$ are listed in TABLE 5. Curves 120, 122, 124, 126 and 128 show the optical response for β equals 1.0, 0.5, 0.2, 0.1 and 0.05, respectively.

TABLE 4

| β | $t_o/[\lambda/(4n_c)]$ | $t_o$, microns |
|---|---|---|
| 0.1 | 5.33 | 2.08 |
| 0.1 | 4.69 | 1.83 |
| 0.5 | 3.62 | 1.41 |
| 1.0 | 2.80 | 1.09 |
| 10.0 | 0.97 | 0.38 |

TABLE 5

| β | $t_o/[\lambda/(4n_c)]$ | $t_o$, microns |
|---|---|---|
| 0.05 | 3.78 | 1.47 |
| 0.10 | 3.39 | 1.32 |
| 0.20 | 2.88 | 1.12 |
| 0.50 | 2.13 | 0.83 |
| 1.00 | 1.60 | 0.63 |

Representative values for the stress, thickness and diameter of the movable layer 30b for some of the above-described exemplary embodiments of temperature measuring devices according to the present invention are provided below. The optical response of a temperature measuring device with $T_{sel}$=300 K. was shown in FIG. 14. Selecting β=1.0, Table 4 gives $t_o$=1.09 microns. Those values of β and $t_o$, and expressions [16] and [17] give:

$$D = 8.35 \, (m_d S)^{0.5}.$$

Values of D computed from the previous expression are listed in TABLE 6 below.

TABLE 6

| S, MPa | $m_d$ | D, microns |
|---|---|---|
| 150 | 1 | 102 |
| 150 | 3 | 177 |
| 150 | 5 | 228 |
| 600 | 1 | 205 |
| 600 | 3 | 354 |
| 600 | 5 | 457 |
| 1000 | 1 | 264 |
| 1000 | 3 | 457 |
| 1000 | 5 | 590 |

Likewise, with $T_{sel}$=473 K. and selecting β=0.5, TABLE 5 gives $t_o$=0.83 microns. Those values of β and $t_o$, and expressions [16] and [17] give D=5.15 $(m_d S)^{0.5}$.

A temperature measuring device according to the present invention can be formed using a method very similar to that used for fabricating the present type I and II pressure measuring devices. For the temperature measuring device, the fabrication method must be modified to provide the cavity 33. This may be simply accomplished by forming the well 37 as described in previous embodiments and then "capping" it, such as by bonding a silicon wafer over the mouth of the well.

The devices described in Sections I–III above can be advantageously formed into arrays. Such arrays can be used, for example, to provide a pressure or temperature profile of a very localized phenomenon. In one exemplary embodiment, a plurality of pressure or temperature measuring devices are fabricated on a wafer. One or more of such wafers are formed and embedded in, or disposed on, a surface exposed to the environment to be measured. An optical signal reflected from the movable layer (or transmitted through it for transmissive device) of each device is guided by the optical fiber to a photodetector array. The photodetector array is operable to measure the optical signal delivered from each optical fiber. An electrical signal corresponding to measured optical signal is produced by the photodetector array and delivered to a processor operable to convert the signal information to a temperature or pressure using data developed according to the present invention.

In a second exemplary embodiment, at least one pressure measurement device and one temperature measurement device according to the present invention are fabricated in close proximity to one another on a single chip. Such an arrangement provides the ability to measure the temperature and pressure of an environment at nearly the same location. Fabrication of wafers possessing more than one type of measurement device can be accomplished by cofabrication or by using flip-chip bonding methods, which are generally well known. For a description of a flip-chip bonding method for forming chips containing more than one type of device, see U.S. patent application Ser. No. 08/766,214 filed Dec. 12, 1996 and entitled HYBRID CHIP AND METHOD THEREFOR.

Although specific embodiments of this invention have been shown and described herein, it is to be understood that these embodiments are merely illustrative of the many possible specific arrangements that can be devised in application of the principles of the invention. Numerous and varied other arrangements can be devised in accordance with these principles by those of ordinary skill in the art without departing from the scope and spirit of the invention.

We claim:

1. An article having an optical fiber integrally attached to a micro-device, the article comprising:

a micro-device having spaced movable and nonmoving layers;

an optical fiber attached to the micro-device, the optical fiber having an optical core in optical communication with the nomnoving layer and the movable layer; and an integrating arrangement for attaching the optical fiber to the micro-device, wherein the integrating arrangement comprises a layer of adhesive that is index-matched to a refractive index of the optical core, wherein, the movable layer is physically adapted for moving relative to the nonmoving layer under the influence of an actuating force, such that the relative movement changes the space between the movable and nonmoving layers so that micro-device reflectivity changes.

2. The article of claim 1, and further wherein the integrating arrangement includes a layer of glass that is disposed on the nonmoving layer.

3. The article of claim 1, and further wherein the movable layer has damping holes.

4. The article of claim 3, and further wherein the actuating force is an electrostatic force generated across the movable and nonmoving layers as a result of an applied voltage from a controlled voltage source.

5. The article of claim 1, and further wherein the actuating force is a pressure exerted by a fluid that is in contact with the movable layer.

6. The article of claim 5, and further comprising an instrumentality for relating changes in reflectivity to changes in the pressure exerted by the fluid.

7. The article of claim 6, and further wherein the space between the movable and nonmoving layers is filled with a gas.

8. The article of claim 7, and further wherein the fluid is characterized by a substantially constant temperature.

9. The article of claim 8, and further wherein the fluid is blood.

10. The article of claim 6, and further wherein the space between the movable layer and the nonmoving layer is in the range of from about 0.1 to 5.0 microns.

11. The article of claim 6, and further wherein the movable layer is characterized by a tensile stress that is in the range of from about 0 to 1000 MPa.

12. The article of claim 6, and further wherein the movable layer has a cross-sectional area within the range of from about 500 to 100,000 square microns.

13. The article of claim 1, wherein the movable layer is characterized by a first side and a second side, and wherein a chamber is defined between the nonmoving layer and the first side of the movable layer, the article further comprising an evacuated cavity located on the second side of the movable layer.

14. The article of claim 13, and further wherein the chamber contains a gas.

15. The article of claim 14, and further wherein the actuating force is a pressure exerted by the gas on the movable layer, which pressure varies only in response to temperature changes in the gas.

16. The article of claim 15, and further comprising means for relating changes in reflectivity to changes in the temperature of the gas.

17. The article of claim 16, and further wherein the space between the movable layer and the nonmoving layer is in the range of from about 0.1 to 5.0 microns.

18. The article of claim 16, and further wherein the movable layer is characterized by a tensile stress that is in the range of from about 0 to 1000 MPa.

19. The article of claim 16, and further wherein the movable layer has a circular shape and has a diameter in the range of from about 500 to 100,000 square microns.

20. The article of claim 1, and further comprising a semiconductor wafer, wherein the micro-device is disposed on the semiconductor wafer.

21. The article of claim 20, wherein the micro-device is configured for measuring pressure, and further comprising a second micro-device and integrally attached optical fiber, wherein, the second micro-device is configured for measuring temperature.

22. A method for measuring at least a change in a value of a physical condition selected from the group consisting of pressure and temperature, comprising the steps of:

forming a device having a movable layer that moves in response to the change in the physical condition, the device having a variable reflectivity, wherein the reflectivity varies as a function of the movement of the movable layer;

delivering an incoming optical signal to the device, the incoming optical signal having a first amplitude; and measuring a second amplitude of a portion of the incoming optical signal returned from the device as an outgoing optical signal.

23. The method of claim 22, and further comprising the step of developing a correlation between the second amplitude of the outgoing optical signal and the value of the physical condition.

24. The method of claim 23, and further comprising the step of determining the value of the physical condition corresponding to the second measured amplitude by using the correlation.

25. The method of claim 22, wherein the step of forming further comprises the steps of forming a sealed chamber on a first side of the movable layer between the movable layer and a nonmoving layer.

26. The method of claim 25, wherein the step of forming further comprises filling the sealed chamber with a gas.

27. The method of claim 26, wherein the step of forming further comprising forming a chamber on a second side of the movable layer, wherein the chamber is evacuated.

28. A method for making a micro-device suitable for measuring a change in a value of a physical condition selected from the group consisting of pressure and temperature, comprising the step of:

forming a movable layer spaced from a nonmoving layer, the space therebetween defining a sealed chamber, wherein, the sealed chamber is formed by:

depositing a first layer on a support;

depositing a rapidly-etchable layer on the first layer;

patterning the rapidly-etchable layer into a pill having at least one arm extending therefrom, wherein, the pill is patterned over a first region of the first layer at which the movable layer is to be formed;

depositing a second layer over the patterned rapidly-etchable layer; and delivering etchant to the arms and the support;

wherein, the etchant etches away the arms forming channels, which channels allow etchant to be delivered to the pill for its removal, thereby forming the sealed chamber, and further wherein, the etchant etches away a portion of the support beneath the first region of the first layer, thereby releasing the first region of the first layer to form the movable layer.

29. The method of claim 28, and further comprising the steps of:

depositing a layer of glass on the second layer; and forming access wells through the glass layer communication with the arms; wherein, etchant is delivered to the arms via the access wells.

30. The method of claim 29, and further comprising the step of:

attaching an optical fiber having an optical core to the glass layer using an adhesive, wherein, the adhesive and the glass layer have respective first and second indices of refraction that are about equal to an index of refraction of the optical core.

* * * * *